Figure 1:
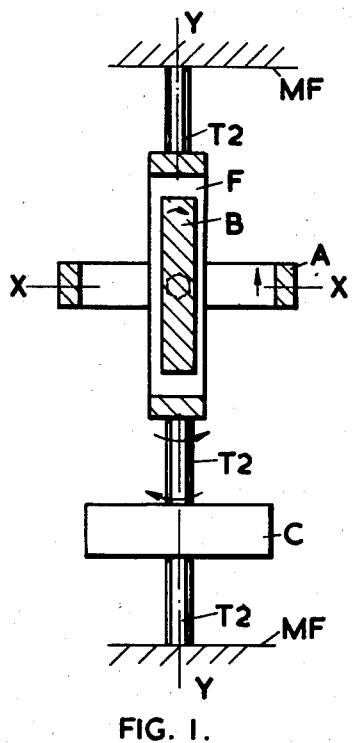

June 29, 1965 G. H. HUNT 3,191,443
OSCILLATING GYROSCOPIC DEVICE
Filed Oct. 22, 1962 2 Sheets-Sheet 1

United States Patent Office 3,191,443
Patented June 29, 1965

3,191,443
OSCILLATING GYROSCOPIC DEVICE
Geoffrey Harold Hunt, Farnham, Surrey, England, assignor to the Minister of Aviation, in Her Majesty's Government of the United Kingdom of Great Britain and Northern Ireland, London, England
Filed Oct. 22, 1962, Ser. No. 232,129
8 Claims. (Cl. 73—505)

This invention relates to gyroscope apparatus and especially to such apparatus in which vibratory or oscillatory bodies are employed instead of the rotary bodies of conventional gyroscope apparatus.

In gyroscope apparatus according to the invention two oscillatory bodies on a first torsion bar mounting have equal natural frequencies of oscillation respectively about the axis of said mounting whereby oscillation of either body is accompanied by oscillation of the other in antiphase, and two further oscillatory bodies one of which includes the first torsion bar mounting with the two oscillatory bodies thereon, on a second torsion bar mounting whose axis intersects that of the first torsion bar mounting at right angles, have equal natural frequencies respectively about the axis of said second mounting whereby oscillation of either is accompanied by oscillation of the other in anti-phase, the equal natural frequencies of oscillation of the two bodies on the second torsion bar mounting being equal to those of the two bodies on the first torsion bar mounting, whereby, when the oscillatory bodies on either of the two torsion bar mounting are oscillating, deflection of the whole about a response axis brings about oscillation of the oscillatory bodies on the other torsion bar mounting.

Provision for maintaining the two bodies on the one, input, torsion bar mounting in continuous oscillation and deriving from the two bodies on the other, output, torsion bar mounting a signal dependent upon their responsive oscillation may take various forms.

However, the oscillatory torsional forces consequent upon deflection of the second torsion bar mounting and which give rise to the responsive oscillation of the two bodies on whichever of the two torsion bar mountings is used as the output mounting, are proportional to the rate of such deflection. Thus the lighter the damping (i.e. the higher the "Q") of the bodies on the output mounting the more closely with the rate of increase of the amplitude of the responsive oscillation correspond to the rate of the deflection, whereas the heavier the damping (i.e. the lower the "Q") of the output bodies on their mounting the more closely will the amount or magnitude of the responsive oscillation correspond to the rate of the deflection.

In general, it is desirable that both the input and the output bodies on their respective mountings should be very lightly damped.

In general, also, the first torsion bar mounting will include a first torsion bar which extends between opposite sides of an open frame-like oscillatory body and has a bar-shaped oscillatory body midway of its length, and a rigid support member by which said first torsion bar is supported at nodal points in its length within the open frame-like oscillatory body at opposite sides of the bar-shaped oscillatory body, and the second torsion bar mounting will include a second torsion bar extending at right angles to the first torsion bar from the rigid support member to a solid oscillatory body spaced from said member.

Preferably, the second torsion bar includes a second support member by which it is supported at a nodal point in its length between the rigid support member of the first torsion bar mounting and the solid oscillatory body.

If desired, however, the rigid support member of the first torsion bar mounting may extend from the first torsion bar beyond the two oscillatory bodies on the first torsion bar to a third torsion bar which is coaxial with the second torsion bar and constitutes part of the second torsion bar mounting, said second torsion bar mounting including rigid support means for the third torsion bar at a point spaced from the rigid support member of the first torsion bar mounting and for the second torsion bar at a point spaced from the solid oscillatory body at that side of the latter remote from said rigid support member.

The two oscillatory bodies on the first torsion bar mounting may extend diametrically of the axis of the first torsion bar mounting, the one substantially at right angles to the axis of the second torsion bar mounting and the other substantially in the direction of the axis of the second torsion bar mounting in which case the response axis will be normal to the plane defined by said axes of the two torsion bar mountings; or, alternatively the two oscillatory bodies on the first torsion bar mounting may extend diametrically of the axis of said first torsion bar mounting substantially at right angles to one another and so oriented about said axis that the angle between them is substantially bisected by the axis of the second torsion bar mounting, in which case the response axis will be to deflection of the whole about the axis of the second torsion bar mounting as response axis.

The invention is illustrated by the accompanying drawings which are diagrammatic only and not to scale.

Figure 2:
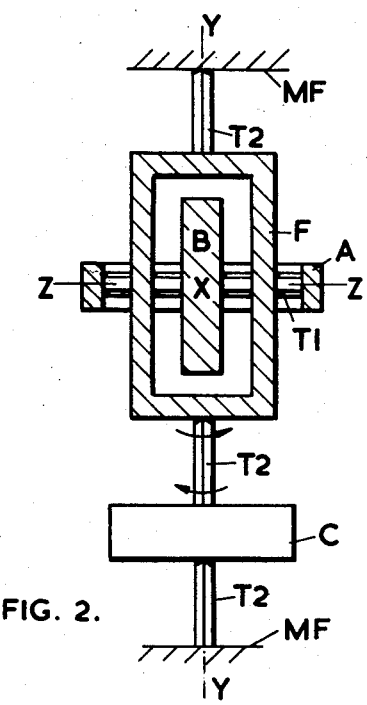
Figure 3:
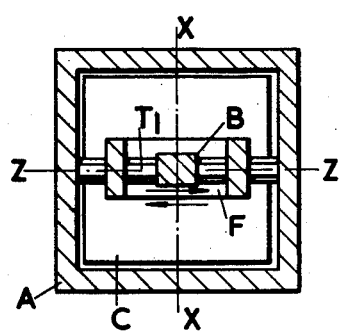
Figure 4:
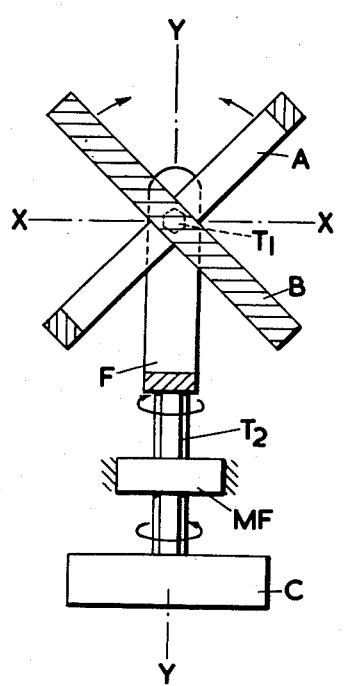
Figure 5:
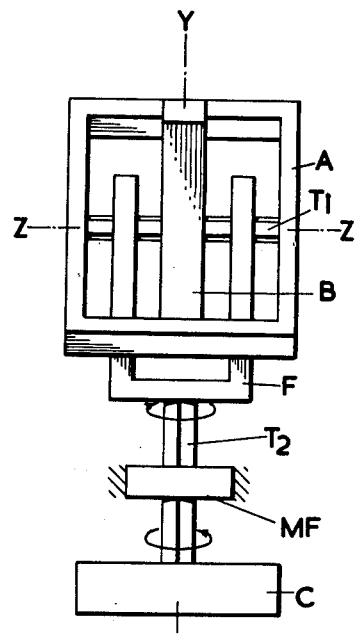
Figure 6:
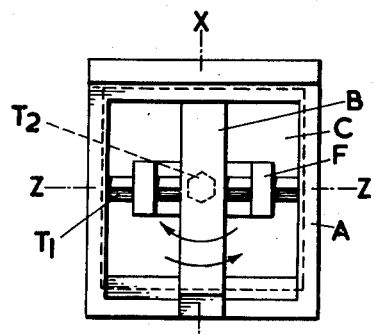

FIGURES 1, 2 and 3 show by way of example one arrangement of the two torsion bar mountings and the oscillatory bodies thereon, in part sectional front elevation, side elevation and plan, respectively, and FIGURES 4, 5 and 6 show by way of example another arrangement in part sectional front elevation, in side elevation and in plan, respectively. Both these arrangements lend themselves to production by machining from a single piece of material.

As shown in FIGURES 1, 2 and 3 a first torsion bar mounting comprises a frame F carrying a torsion bar T1 which in turn carries an open rectangular oscillatory body A outside the frame F and a bar shaped oscillatory body B within the frame F. If not formed integrally, the bodies A and B and the frame F are secured rigidly to the torsion bar T1. The bodies A and B are balanced individually about the axis Z—Z of the torsion bar T1 and their natural frequenies of oscillation about the axis Z—Z are equal to one another. The places in its length at which the bar T1 joins (or is secured to) the frame F corresponds to what are nodal points in its length when the bodies A and B are in anti-phase oscillation at their equal natural frequencies.

A second torsion bar mounting comprises a main frame, opposite parts of which are indicated at MF, MF, carrying a torsion bar T2 having the frame F of the first torsion bar interposed in its length. The frame F together with the parts A, B and T1 carried by it serve as one (composite) body carried by the bar T2 and a second solid rectangular body carried by the bar T2 is indicated at C. Here again, if not formed integrally, the frame F and the body C and at least the portions indicated in the drawing of the main frame MF are secured rigidly to the torsion bar T2. The bodies FABT1 and C are balanced individually about the axis Y—Y of the torsion bar T2 and their natural frequencies of oscillation about the axis Y—Y are equal to one another and to the equal natural frequencies of the bodies A and B about the axis Z—Z. Here also, the places in its length where the bar T2 joins (or is secured to) the main frame MF correspond to what are effectively nodal points in its length with the bodies FABT1 and C are in anti-phase oscillation.

The axes Y—Y and Z—Z intersect one another at right angles, in this case at the centre of gravity of the composite body FABT1.

If an oscillatory drive about the axis Z—Z relative to the frame F be applied to either of the bodies A and B, then the other body B or A will oscillate in sympathy and, the natural frequencies of said bodies being equal, such sympathetic oscillation is 180 degrees out of phase with the driven oscillation and so counterbalances it. Similarly, if an oscillatory drive be applied to either the frame F (i.e. to the composite body FABT1) or to the body C relative to the main frame MF, the other of said bodies will oscillate in sympathy and at 180 degrees out of phase with the driven oscillation and so counterbalance the latter.

Any tilting or deflection of the main frame MF about a response axis X—X normal to the plane defined by the oscillation axes Y—Y and Z—Z when the bodies A and B are oscillating, will give rise to Coriolis forces resulting in oscillation of the bodies FABT1 and C on the torsion bar T2 in response to the deflection. Similarly, such deflection when the bodies FABT1 and C are oscillating will result in oscillation of the bodies A and B on the bar T1 in response to the tilting. Thus, in use, either the bodies FABT1 and C may be maintained in continuous oscillation and a response signal obtained from one or both of the bodies A and B, or vice versa.

In the arrangement shown in FIGURES 4, 5 and 6, in which the same reference letters as in FIGURES 1, 2 and 3 indicate corresponding parts, a rigid support member F which corresponds to the frame F of the FIGURES 1, 2 and 3 arrangement is in the form of a two tine fork which extends only a short distance beyond the first torsion bar T1. The oscillatory bodies A and B are so oriented about the first torsion bar axis Z—Z that the axis Y—Y of the second torsion bar T2 substantially bisects the angle between them, thus representing a multiplication sign (FIGURE 4) instead of a plus sign (FIGURE 1). The torsion bar T2 extends only between the support member F and the body C, and the assembly is supported, as indicated in FIGURES 4 and 5 only, solely at a nodal point in the length of said bar T2.

The balancing and functioning are generally the same as in the case of FIGURES 1, 2 and 3, but in this case when either the bodies A and B, or the bodies FABT1 and C, are oscillating, the other bodies FABT1 and C, or the bodies A and B, will be caused to oscillate by any tilting or deflection about the axis Y—Y of the second torsion bar T2. Thus, in the case of FIGURES 4, 5 and 6, as well as in the case of FIGURES 1, 2 and 3 either the bodies FABT1 and C may be maintained in continuous oscillation and a response signal obtained from one or both of the bodies A and B, or vice versa.

It is, in general, preferred to employ an electrostatic device to impart driving torque to either or to both of the bodies that are maintained in continuous oscillation during use and to employ electromagnetic pick-off means to obtain a signal when the other two bodies oscillate in response to deflection of the second torsion bar mounting.

Also, in general, it is preferred to employ for driving, a regenerative or positive feed back arrangement in which a preferably electrostatic, drive device is energised at the natural frequency of oscillation of the driven body with which its is associated from the output of an amplifier to whose input is applied a signal derived from a preferably electromagnetic, pick-off associated with said driven body.

It will, in general, be advantageous for the bodies on the second torsion bar mounting to be maintained in continuous oscillation, for example in the arrangements illustrated, by an electrostatic device (not shown) whose body is mounted on the main frame MF and whose driving plate is part of or is connected to the body C, and to pick off a response signal from either or both of the bodies on the first torsion bar mounting. In this case the responsive bodies A and B would receive energy only by way of the torsion bar T2 and so would not receive any skew driving forces, the response signal being obtained from electromagnetic pick off means associated with either or both of them.

Nevertheless it would be possible to maintain the bodies A and B in continuous oscillation and to pick off a response signal from either or both of the bodies C and FABT1. For example in the arrangements illustrated a drive device may have its body incorporated with the oscillatory body B and its driving element incorporated with oscillatory body A, an electromagnetic pick off being associated with the body C. Alternatively, the drive device could be mounted on the main frame MF and have its driving element on or connected with the body A.

It will be apparent that various modifications are possible, in particular that the multiplication sign orientation of the bodies A and B of FIGURES 4, 5 and 6 may be used in an arrangement otherwise similar to that of FIGURES 1, 2 and 3, and that the plus sign orientation of said bodies A and B of FIGURES 1, 2, and 3 may be used in an arrangement otherwise similar to that of FIGURES 4, 5 and 6. In one possible modification, having either the multiplication or the plus sign orientation of bodies A and B, and using a frame F as in FIGURES 1, 2 and 3 (as distinct from a fork F as in FIGURES 4, 5 and 6), the body C may be replaced by a body in the form of an open frame which surrounds the composite body FABT1, and joins a two section torsion bar T2, which is supported on a main frame at two nodal points in its length, at opposite sides of said composite body, in much the same way as the body B joins the torsion bar T1 which latter is supported at two nodal points in its length.

The chief causes of inaccurate operation of oscillatory gyroscope apparatus according to the invention arise from (1) the means employed to maintain continuous oscillation of the bodies on one of the torsion bar mountings, (2) from asymmetries about the axes of the two torsion bars, errors due to both of which causes are reduced when it is the second torsion bar bodies that are maintained in continuous oscillation, (3) from inequality of the natural frequencies of oscillation i.e. non-resonance, of the bodies on the two torsion bar mountings, and (4) axis misalignment, e.g. of the axes of the four portions (see FIGURES 2 and 5) of the torsion bar T1 or of the axes of the three portions of the torsion bar T2 (FIGURE 2), errors due to both of which latter causes are dependent upon accuracy of manufacture, stability of the material(s) used and the rigidity of design, e.g. ideally, only the torsion bars should suffer any strain in use.

The amplitude of oscillation even of the driven bodies will in general be small, for example only a few minutes of arc at 500 cycles per second. Appreciable non-resonance between the two systems comprising the two torsion bar mountings with the respective oscillatory bodies thereon is to be avoided because it will prevent the use of the phase relationship between the response signal and the oscillatory input or driving torque to discriminate against errors due to mass unbalance. The use of balanced torsion systems as in apparatus according to the invention ensures that changes of oscillation frequency with changes of direction of the gravity or acceleration field to which the apparatus is subject shall be very small. The effect of temperature changes will be of little significance provided they are uniform throughout the apparatus.

I claim:

1. Gyroscope apparatus in which two oscillatory bodies on a first torsion bar mounting have equal natural frequencies of oscillation, respectively, about the axis of said mounting whereby oscillation of either body is accompanied by oscillation of the other in anti-phase, and two further oscillatory bodies one of which includes the first torsion bar mounting with the two oscillatory bodies thereon, on a second torsion bar mounting whose axis intersects that of the first torsion bar mounting at right angles, have equal natural frequencies of oscillation respectively about the axis of said second torsion bar mounting whereby oscillation of either is accompanied by oscillation of the other in anti-phase, the equal natural frequencies of oscillation of the two bodies on the second torsion bar mounting being equal to those of the two bodies on the first torsion bar mounting, whereby when the oscillatory bodies on either of the two torsion bar mountings are oscillating, deflection of the whole about a predetermined response axis brings about oscillation of the bodies on the other torsion bar mounting.

2. Gyroscope apparatus as claimed in claim 1, wherein the first torsion bar mounting includes a first torsion bar which extends between opposite sides of an open frame-like oscillatory body and has a bar-shaped oscillatory body midway of its length, and a rigid support member by which said first torsion bar is supported at nodal points in its length with the open frame-like oscillatory body at opposite sides of the bar-shaped oscillatory body, and wherein the second torsion bar mounting includes a second torsion bar extending at right angles to the first torsion bar from the rigid support member to a solid oscillatory body spaced from said member.

3. Gyroscope apparatus as claimed in claim 2, wherein the second torsion bar mounting includes a second support member by which the second torsion bar is supported at a nodal point in its length between the rigid support member of the first torsion bar mounting and the solid oscillatory body.

4. Gyroscope apparatus as claimed in claim 2, wherein the rigid support member of the first torsion bar mounting extends from the first torsion bar beyond the two oscillatory bodies on the first torsion bar to a third torsion bar which is coaxial with the second torsion bar and constitutes part of the second torsion bar mounting, said second torsion bar mounting including rigid support means for the third torsion bar at a point spaced from the rigid support member of the first torsion bar mounting and for the second torsion bar at a point spaced from the solid oscillatory body at that side of the latter remote from said rigid support member.

5. Gyroscope apparatus as claimed in claim 3 wherein the two oscillator bodies on the first torsion bar mounting extend diametrically of the axis of said first torsion bar mounting, the one susbtantially at right angles to the axis of the second torsion bar mounting and the other substantially in the direction of the axis of said second torsion bar mounting, the response axis being normal to the plane defined by said axis of the two torsion bar mountings.

6. Gyroscope apparatus as claimed in claim 3, wherein the two oscillatory bodies on the first torsion bar mounting extend diametrically of the axis of said first torsion bar mounting substantially at right angles to one another and so oriented about said axis that the angle between them is substantially bisected by the axis of the second torsion bar mounting, the response axis being coincident with the axis of the second torsion bar mounting.

7. Gyroscope apparatus as claimed in claim 4 wherein the two oscillatory bodies on the first torsion bar mounting extend diametrically of the axis of said first torsion bar mounting, the one substantially at right angles to the axis of the second torsion bar mounting and the other substantially in the direction of the axis of said second torsion bar mounting, the response axis being normal to the plane defined by said axis of the two torsion bar mountings.

8. Gyroscope apparatus as claimed in claim 4 wherein the two oscillatory bodies on the first torsion bar mounting extend diametrically of the axis of said first torsion bar mounting substantially at right angles to one another and so oriented about said axis that the angle between them is substantially bisected by the axis of the second torsion bar mounting, the response axis being coincident with the axis of the second torsion bar mounting.

References Cited by the Examiner
UNITED STATES PATENTS

| 2,514,250 | 7/50 | Meredith | 73—505 |
| 2,972,892 | 2/61 | Tiffany | 73—505 |
| 3,017,775 | 1/62 | Entin | 73—505 |

FOREIGN PATENTS 611,011 10/48 Great Britain.

RICHARD C. QUEISSER, *Primary Examiner.*
ROBERT L. EVANS, JOSEPH P. STRIZAK, *Examiners.*